No. 647,354. Patented Apr. 10, 1900.
V. D. ANDERSON.
PRESS.
(Application filed Sept. 6, 1899.)
(No Model.)
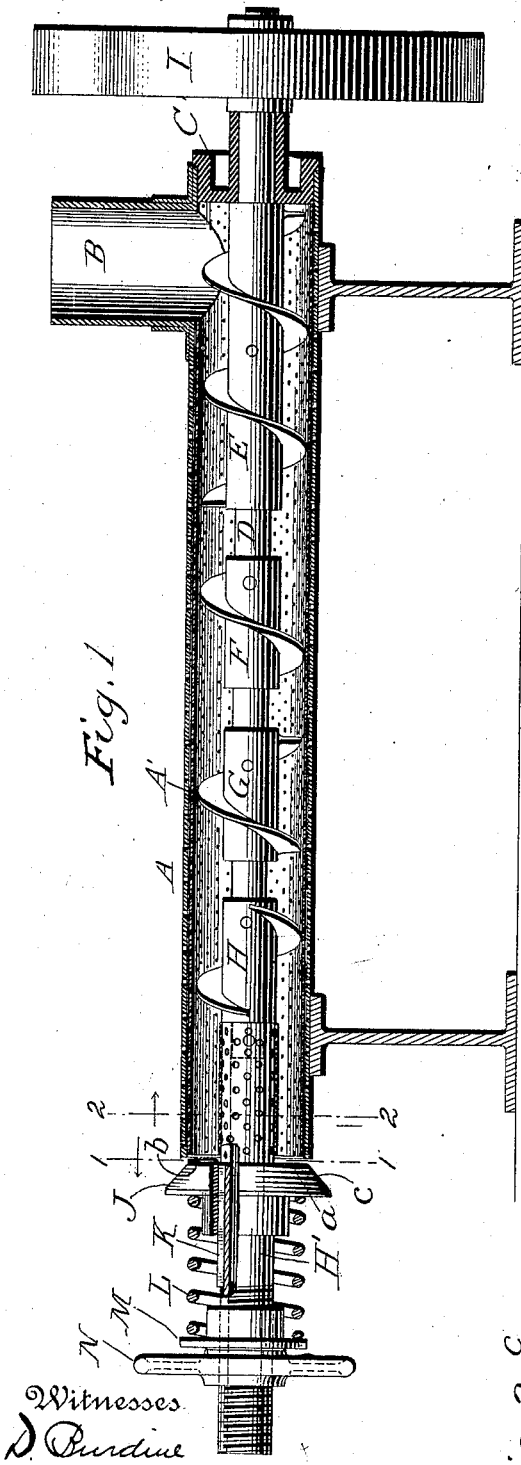
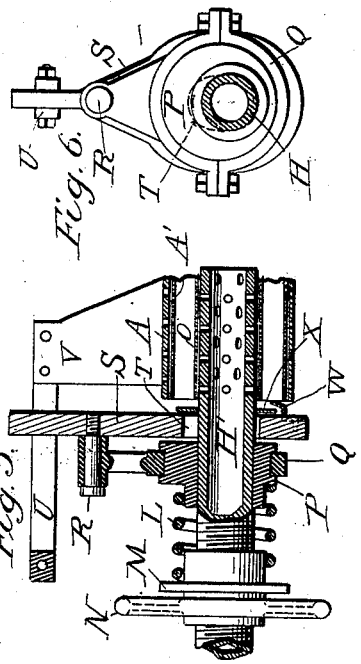
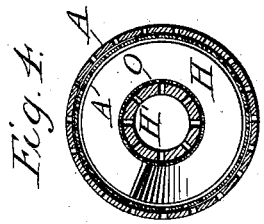
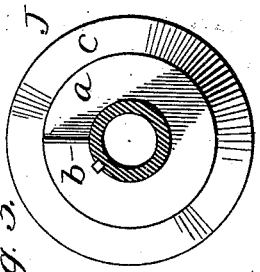
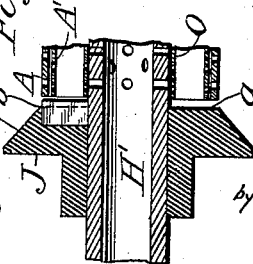
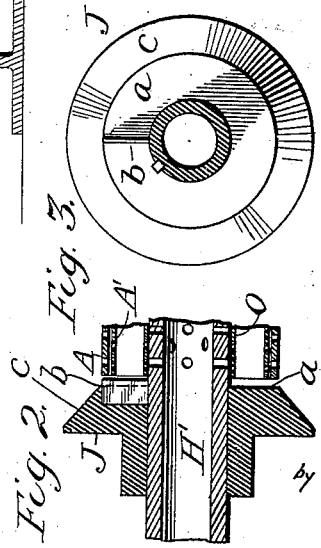
Witnesses
D. Burdine
J. M. Pond
Inventor:
Valerius D. Anderson
by
Dodge Sons,
Attorneys

UNITED STATES PATENT OFFICE.

VALERIUS D. ANDERSON, OF CLEVELAND, OHIO.

PRESS.

SPECIFICATION forming part of Letters Patent No. 647,354, dated April 10, 1900.

Application filed September 6, 1899. Serial No. 729,612. (No model.)

*To all whom it may concern:*

Be it known that I, VALERIUS D. ANDERSON, a citizen of the United States, residing at Cleveland, in the county of Cuyahoga and State of Ohio, have invented certain new and useful Improvements in Presses, of which the following is a specification.

My present invention relates to presses, the construction and advantages of which will be hereinafter set forth, reference being had to the annexed drawings, wherein—

Figure 1 is a longitudinal sectional view of the press; Fig. 2, a similar view of a portion of the central draining-tube; Fig. 3, a vertical sectional view on the line 1 1 of Fig. 1; Fig. 4, a similar view on the line 2 2; Fig. 5, a sectional view illustrative of certain modifications, and Fig. 6 an end view of the same parts.

The object of my invention is to provide a simple and at the same time highly-efficient expressing-press, one capable of handling brewers' slops, slaughter-house refuse, and like material which oftentimes is so soft and mushy as to be handled only with difficulty in expensive and elaborate machines, and then not always with a great degree of success. It has been found from the use of the apparatus about to be described that such material can be readily and effectively handled and with a degree of rapidity unattainable with more complicated forms of apparatus.

Referring to the drawings, A denotes a cylindrical shell or casing provided with a number of perforations throughout its length and with a feed-hopper B at one end. Preferably, though not necessarily so, the outer cylindrical shell is provided with a lining A', of brass or the like, which is also perforated throughout its length.

Extending into the shell or casing through a head C is a shaft D, upon which is mounted a series of screws E, F, G, and H, the screws being separated from each other and the end of the blade of each succeeding screw overlapping that of the next. In other words, the end of the blade of screw E overlaps the beginning of the blade of screw F, and the end of the blade of screw F overlaps the beginning of screw G, and so on throughout the series. In the arrangement shown the ends of the four blades are arranged so that they stand at about ninety degrees to each other or are placed quartering around the shaft. The purpose and function of the arrangement will be hereinafter pointed out.

In the construction shown the shaft does not extend entirely through the body or shell of the press, but stops short of the discharge end thereof. To this end of the shaft there is connected a section of pipe H', perforated throughout that portion which is within the shell and having its outer end externally threaded, as indicated in Figs. 1 and 5. The connection of this section, which I shall hereinafter term the "central drainer," to the shaft is such that it partakes of the rotary motion imparted to the shaft through a driving-pulley I, mounted upon the opposite end thereof. Mounted upon said central drainer immediately adjacent to the discharge end of the shell or casing is a sliding plug or head J, which is caused to rotate with the drainer and shaft by a spline or feather K, secured upon the drainer. The plug or head is preferably made in the form illustrated in Figs. 1, 2, and 3—that is, it is formed with a flat face $a$, in which is mounted a knife $b$, and a rearwardly-inclined face $c$. The plug or head is urged up toward the discharge end of the shell or casing by a spring L, which bears against its rear face and at the opposite end against a washer M. The requisite degree of pressure according to the substance being treated is imparted to the spring by a hand wheel or nut N, mounted upon the threaded end of central drainer. The inner perforated portion of the central drainer is preferably provided with an outer covering or shell O, formed of the same material as the lining A' of the outer shell or casing.

The operation of the apparatus thus far described is as follows: Motion having been imparted to the shaft, the material to be deprived of moisture is fed into the hopper and is caught by the first screw E and carried forward, the water and other contained liquids meanwhile partially draining out through the perforated shell. As the material passes from the end of the first screw it enters the space left in the shell, intermediate it and the next screw, where it will cease to be carried around by the screw and will gradually be forced forward up to the next screw F. Screw F exerts a certain degree of what may be termed "back pressure" upon the material which is fed forward by the screw E. Screw F then takes the material and moves it another step forward to screw G, and as soon as the material reaches this point there is a degree of back pressure exerted, for the overlapping blades of the screws F and G will have a tendency to force the material back into the spaces left in the shell or casing and against the material being fed forward by the adjacent screw. It is to be understood, of course, that the same action takes place between each pair of screws. Thus it is that there is a series of spaces formed in the shell or casing where the material is not carried around by the screw, but is held at rest so far as rotary motion is concerned and gradually fed forward under pressure from one screw to the one next in the series. This action takes place in each space formed intermediate the screws and has been found in actual practice to afford admirable results with various classes of materials. As the material leaves screw H it is held in the shell or casing by the spring-pressed head or plug J, said screw forcing the material up against said head, the liquid passing out through the central discharge-chamber and outer shell. It will be noted that the material as it is passed through this part of the apparatus is held in a relatively-thin layer with drainage afforded upon the inner and outer surface thereof. As the pressed material comes in contact with the rotary head or plug, the knife b cuts away or disintegrates the compressed mass, permitting it to pass gradually from the press, and yet always holding it to such an extent that the screw H may act with a degree of pressure thereon.

Should any extraneous or hard substance be carried along by the material, the head or plug will simply be forced back thereby, permitting it to pass out, after which the spring will force the head back to its proper position. The degree of pressure to be placed upon the sliding head will be determined by the nature of the substance under treatment.

While I have shown four screws upon the shaft, four are not essential, and I do not desire to limit myself to any particular number. So, too, screw E need not of necessity extend under the feed-opening, as the press will work equally as well if the screw stops short thereof. Nor do I desire to be limited to any particular form of clearer or disintegrator for the discharge end of the press, as any device which will afford the necessary resistance and at the same time clear the press gradually as the material is forced out falls within my invention. In Figs. 5 and 6 I have shown a modified form of this portion of the press, wherein instead of having a rotary knife, as above described, I employ a reciprocating device. The central drainer in said figures has mounted upon it an eccentric P, about which is passed a strap Q, connected at its upper end to stud or pin R, said pin extending out from a plate S. Plate S is formed with an opening T, through which the central drainer extends. The upper end of the plate, made in the form of an arm, extends up between two guide-bars U, which are carried by a bracket V, mounted on the shell or casing. The lower end of the plate carries a blade or arm W, which works across the discharge end of the shell or casing and acts to gradually break up or disintegrate the material as it leaves the press. Plate S is held up to the discharge end of the shell or casing by an adjustable spring in a manner similar to that employed with the other construction. To prevent the material from being forced into the opening T, a thin disk or plate X is placed in front thereof on the central drainer.

It will be found in working upon some materials that measurably good results may be secured even though the ends of the screws do not overlap. In most cases, however, the overlapping construction will be employed, as better results are obtainable thereby.

While I have shown and described the shell or casing as being formed of a tube having perforations therein, it is to be understood that the perforate shell or casing may be built up in any desired manner and that the claims are not to be read and restricted to those constructions only in which the shell or casing is formed, as shown in the drawings and described in detail herein. In other words, the shell or casing may be formed in any manner which will provide for the suitable drainage-openings throughout its length, and the word "perforate" used throughout the claims in connection with the shell or casing is to be given its broadest meaning and significance.

Having thus described my invention, what I claim is—

1. In a press, the combination of a perforate shell or casing; a shaft mounted therein; and a series of separated screws mounted on and carried by said shaft.

2. In a press, the combination of a perforate shell or casing; a shaft mounted therein; and a series of screws mounted on and carried by said shaft, the screws being separated from each other and having the ends of their blades overlapping, substantially as described.

3. In a press, the combination of a perforate shell or casing; a shaft mounted therein; and a series of separated screws mounted on and carried by said shaft, the forward end of each screw-blade overlapping the discharge end of the preceding screw-blade.

4. In a press, the combination of a perforate shell or casing; a shaft mounted therein; a series of separated screws mounted upon and carried by said shaft; and a yielding plug or head for the discharge end of the shell or casing.

5. In a press, the combination of a perforate shell or casing; a shaft mounted therein; a series of separated screw-blades mounted on said shaft; a yielding head for the discharge end of the shell or casing; and a disintegrating device working across the path of discharge of the material passing from the press.

6. In a press, the combination of a perforate shell or casing; means contained therein for subjecting the material undergoing treatment to pressure; and means at the discharge end of the shell for retarding the discharge of the material, and gradually disintegrating the same as it is forced from the press.

7. In a press, the combination of a perforate shell or casing; means contained therein for subjecting the material undergoing treatment to pressure; adjustable means for retarding the discharge of the material from the press; and means movable across the path of discharge for disintegrating the material as it is forced from the press.

8. In a press, the combination of a perforate shell or casing; a shaft working therein; a series of separated screws mounted on said shaft; a plug or head mounted at the discharge end of the shell; means for holding the plug up to the shell under yielding pressure; and a disintegrating device carried by said plug.

9. In a press, the combination of a perforate shell or casing; a shaft mounted therein; a series of separated screws mounted on said shaft and having the ends of their blades overlapping substantially as described; a rotary head or plug mounted at the discharge end of the shell; and a knife carried by said head in a position to work upon the material as it is forced from the press.

10. In a press, the combination of a perforate shell or casing; a shaft mounted therein; a series of separated screws mounted on said shaft and having the ends of their blades overlapping substantially as described; a tube connected to the shaft and having that portion which is within the shell perforated; a head or disk slidably mounted upon said tube adjacent to the discharge end of the shell; a spring acting against the rear of said head or disk; and a knife carried by said head.

11. In a press, the combination of a cylindrical, perforate shell or casing; a shaft mounted therein; and a series of separated screws mounted upon and carried by said shaft.

12. In a press, the combination of a cylindrical, perforate shell or casing; a shaft mounted therein; a series of separated screw-blades mounted on and carried by said shaft, the ends of the blades overlapping substantially as described; and means at the discharge end of the shell for retarding the discharge of the material and gradually disintegrating the same as it is forced from the press.

In testimony whereof I have signed my name to this specification in the presence of two subscribing witnesses.

VALERIUS D. ANDERSON.

Witnesses:
   THOS. ROBISON,
   CHAS. S. COLLINS.